INVENTORS:
Andrew Dravnieks
Arthur J. Freedman

Gerald Rose
Attorney.

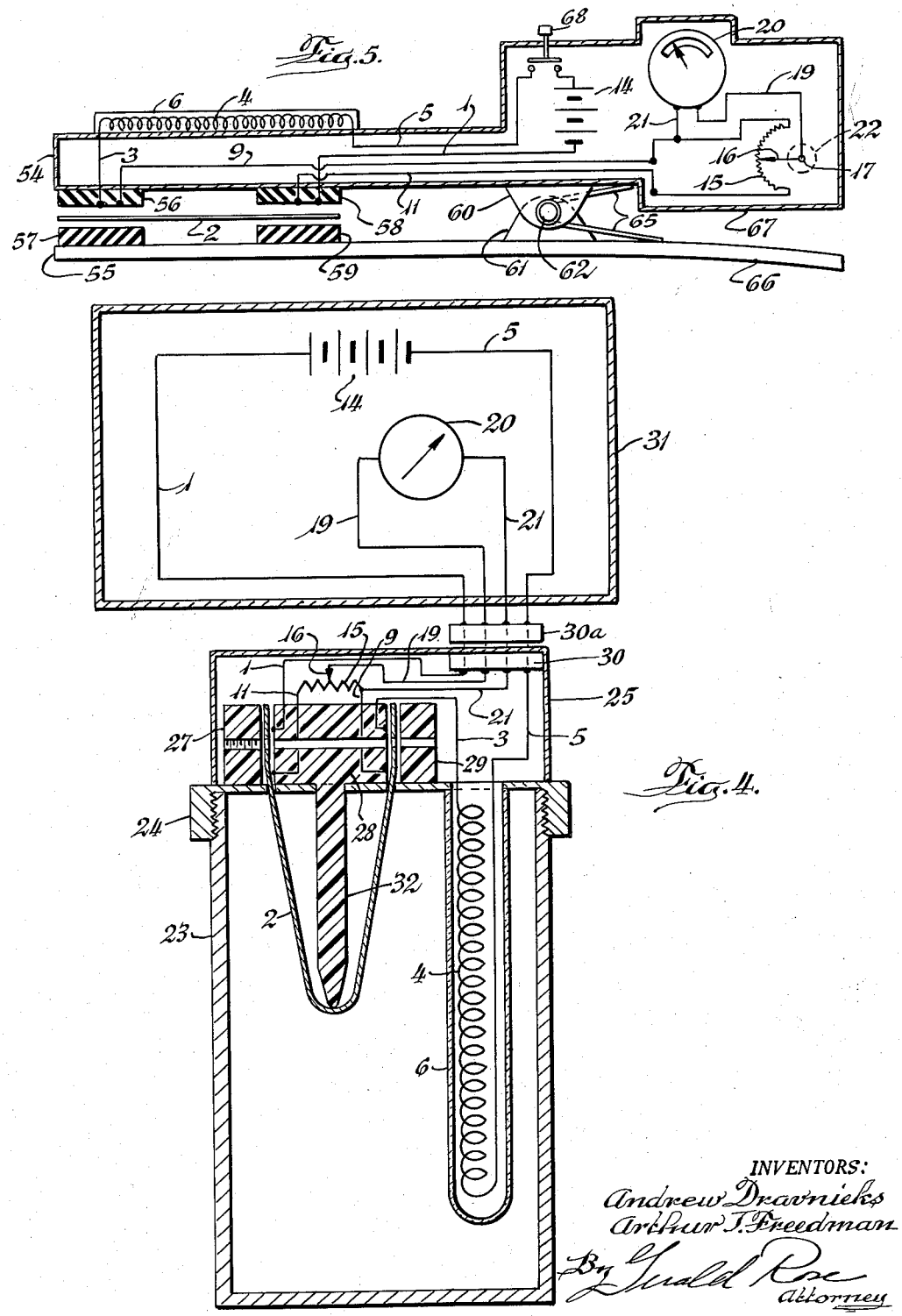

United States Patent Office 3,094,865
Patented June 25, 1963

3,094,865
CONDUCTOMETRIC CORROSION MEASUREMENT SYSTEM
Andrew Dravnieks, Park Forest, and Arthur J. Freedman, Chicago Heights, Ill., assignors to Standard Oil Company, Chicago, Ill., a corporation of Indiana
Filed July 3, 1959, Ser. No. 824,902
3 Claims. (Cl. 73—86)

This invention relates to an improved system for measuring rates of corrosion and erosion. More particularly, it relates to a simplified apparatus for electrically providing a measurement of the rate of corrosion or erosion of metals. In one aspect, the invention provides a conductometric corrosion test apparatus having automatic temperature compensation.

An electrical resistance system has heretofore been developed which directly measures loss of metal from a metallic test specimen exposed to a corrosive atmosphere within process equipment, pipelines and the like. As the test specimen corrodes, its cross sectional area is reduced and since the loss of metal results in an increased resistance, by electrically measuring the conductivity—or rather change in conductivity—of the test specimen, the rate of corrosion of the equipment itself can be determined quickly and accurately.

A variety of types of electrical apparatus have been developed for conveniently measuring the change of conductivity of such test specimens. While these devices are, in general, of excellent design and construction, they are primarily precision instruments and lack the ruggedness and ready availability needed for maximum adoption. Also, most prior-art measuring systems are incapable of providing compensation for temperature changes without making numerous and complex meter readings.

Accordingly, a primary object of the present invention is to provide a system for conductometrically measuring corrosion and erosion rates which, with little sacrifice in accuracy, permits the use of simplified and rugged circuitry. Another object is to provide an apparatus for determining corrosion rates which is easy to construct and use, and involves only a single meter reading. A major object is to provide a corrosion rate measuring apparatus which is automatically and internally compensated for the effect of temperature on the resistance of a test specimen. A further object is to provide a convenient laboratory conductometric corrosion test apparatus. Yet another object is to provide a portable corrosion tester for use in measuring the corrosivity of substances such as automotive radiator fluids and crankcase lubricants. Other and more particular objects will become apparent as the description of the instant invention proceeds in detail.

Briefly, the inventive system comprises an electrical circuit including a source of electromotive force (E.M.F.), an electrically conducting corrosion test specimen which is to be exposed to the corrosive atmosphere, and a corrosion-insensitive compensator resistor in series with the corrosion specimen and having a similar temperature coefficient of electrical resistance to it. The compensator resistor desirably has a resistance many times larger than that of the corrosion specimen. Both the resistor and the corrosion specimens are maintained in sufficiently close proximity so as to be exposed to the same temperatures. Connected across the corrosion specimen is a voltmeter or equivalent device for determining the potential drop across this specimen.

The system operates basically as follows. When an essentially constant E.M.F. is applied to the corrosion test specimen and the protected compensator resistor placed in series, the potential drop across the corrosion specimen is a fraction of the total E.M.F. This fraction is defined by the formula:

$$\frac{\text{Specimen resistance}}{\text{Specimen resistance} + \text{compensator resistance}}$$

The fraction is invariant with temperature if the corrosion specimen and compensator resistor have identical temperature coefficients of resistance. However, the fraction will change when corrosion increases the corrosion specimen resistance. Thus, the potential drop across the corrosion is primarily a function of corrosion alone.

According to the preferred embodiment of the invention, the resistance of the compensator resistor is made much larger than that of the corrosion specimen, preferably at least ten times as large.

In this event, since the resistance of the compensator resistor is by far the highest resistance in the circuit, the current flowing through the above described circuit is essentially governed only by the resistance of the compensator resistor. Consequently, since the corrosion specimen has a relatively much lower resistance, whatever increase in its resistance which occurs as a result of corrosion has at most an insignificant effect on the flow of current through the total circuit. As a result, the current flowing through the circuit is held essentially constant irrespective of corrosion, and measurements made of the change in potential drop across the corrosion specimen are approximately directly proportional to the change in resistance, and hence the extent of corrosion, caused by loss of metal thickness.

In addition to improving the proportionality relationship between potential drop and corrosion rate, the use of a high resistance compensator resistor provides several additional benefits. For one thing, it tends to minimize the effects of lead wire resistance and the effects of internal resistance in the E.M.F. source. Thus lower cost current sources, such as ordinary dry cells, which have a high internal resistance can be used when high accuracy is not at a premium.

The inventive system can be adapted readily to permit automatic and inherent compensation for temperature changes. Heretofore, one of the major problems attendant with conductometric corrosion testing has been due to the change in the resistance of the corrosion specimen due to varying temperatures. The present system can be made to eliminate this difficulty by making both the corrosion specimen and the compensator resistor of materials having similar temperature coefficients of resistance. Both are then placed sufficiently near each other as to be exposed to the same temperature. Thus, although an increasing temperature will increase the resistance of each sample, the potential drop across each will remain constant since the current will proportionally decrease to make the individual IR drops the same as before the temperature rise.

The extreme simplicity of the inventive circuit renders conductometric corrosion test apparatus substantially more rugged and hence lower in cost and more conveniently available than prior art devices. In particular embodiments to be described in detail hereinafter, the system may be applied to laboratory corrosion testing of new corrosion inhibitors or of new metals having improved corrision resistance. A portable device employing the present circuit can be made which is suitable for on-the-spot determination of the corrosiveness of automotive radiator coolants and crankcase lubricants. The present systems are exceedingly useful for making conventional corrosion rate measurements and for corrosion allowance monitoring of processing vessels.

The invention and various embodiments thereof will be described in more detail in conjunction with the following drawings wherein:

FIGURE 4 is a laboratory device suitable for conductometric corrosion testing of new corrosion inhibitors, new corrosion-resistant metals, and the like; and FIGURE 5 is a portable corrosion testing device which utilizes an expendable and replaceable corrosion test specimen and is suitable for automotive corrosion testing.

Figure 1:
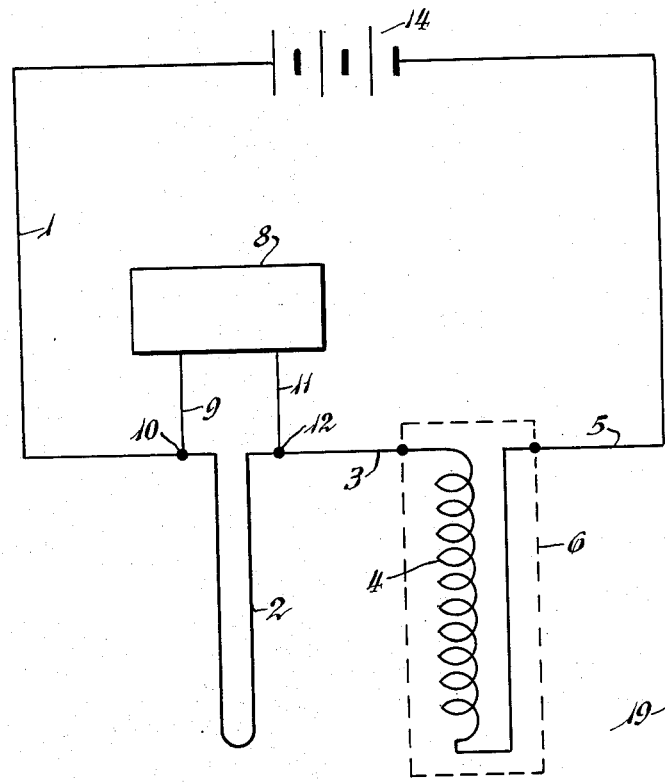
FIGURE 1 is a simplified schematic circuit diagram of the inventive circuit.

Referring to FIGURE 1, the inventive circuit comprises a source of electromotive force 14, a corrosion test specimen 2, a corrosion-insensitive or protected compensator resistor 4, and a means 8 for detecting a potential drop across the corrosion specimen 2.

A typical corrosion test specimen 2 for conductometric corrosion testing is an elongated relatively thin metal sample, such as a long thin electrically-conducting shim or strip having a thickness of from a few ten-thousandths of an inch to about thirty-thousandths of an inch or more. A typical strip may be 3/16 to 1/4 inch wide and 1/2 to two inches long. When a thin flat strip is employed, the width is normally many times the thickness, for example at least ten times the thickness, so that the surface area of the edges is negligible compared to the area of the faces of the specimen. Thus the electrical conductivity of corrosion specimen 2 is substantially a linear function of its thickness. Corrosion specimen 2 may also have other cross-sectional configurations, and may be circular as in a wire, or doughnut-shaped as in a tube. Wire or tubular specimens are usually preferred in permanent installations where mechanical strength of the specimen is desired. Very thin strip specimens, of one-thousandth of an inch or less thickness, are desired for laboratory or automotive use where high sensitivity is needed. The resistance of corrosion specimen 2 may suitably approximate about 0.1 ohm.

Compensator resistor 4, which is in series with corrosion specimen 2 by way of conduits 3, 5 and 1, has a resistance which is desirably many times larger than the resistance of corrosion specimen 2. Illustratively, it is at least about ten, and preferably at least about fifty, e.g. one hundred, times as electrically resistant as the corrosion specimen 2. The closeness with which the instant simplified circuit approaches the ideal of absolute measurement of resistance depends largely on the relative ratios of resistances between the compensator resistor and the corrosion specimen, and for this reason the former is desirably made to have a resistance between one and two orders of magnitude higher than the resistance of corrosion specimen 2. When integral temperature compensation is desired, compensator resistor 4 is made of a material having a similar temperature coefficient of resistance as corrosion specimen 2, desirably substantially the same coefficient. If temperature compensation is unnecessary, this compositional similarity is unnecessary. Increased resistance may be obtained in the usual way by increasing the length of the compensator resistor 4, decreasing its cross-sectional areas, or both. Compensator resistor 4 is protected against direct corrosion by a corrosion-resistant sheath 6, which may be, for example, a glass tube, an insulating resin coating or encapsulation in an organic plastic such as Teflon (polytetrafluoroethylene). Such protection should not, if possible, materially interfere with heat transfer to or from the specimen. In an illustrative embodiment, compensator resistor 4 has a resistance of about six ohms.

As the source of E.M.F., a suitable direct current chemical cell or battery 14 may be included in the circuit. Alternatively, E.M.F. sources such as a regulated D.C. power supply, a thermoelectric generator, or a low voltage A.C. line current may be employed. For optimum precision of measurement, source 14 should have a constant E.M.F. which is relatively independent of time and temperature, and should have a low internal resistance. Mercury cells are generally ideal for this purpose, and have the additional advantage of being relatively small in size and exceedingly temperature-stable.

To detect the potential (or change of potential) across corrosion specimen 2, means 8 are included for detecting this potential drop and thus afford a measure of metal loss by the relation between increases in potential drop and metal loss. This potential-detecting means 8 may take a variety of forms, and in its simplest embodiment is a simple direct current (or alternating current if such is used) voltmeter connected across terminals 10 and 12 via lines 9 and 11.

Figure 2:
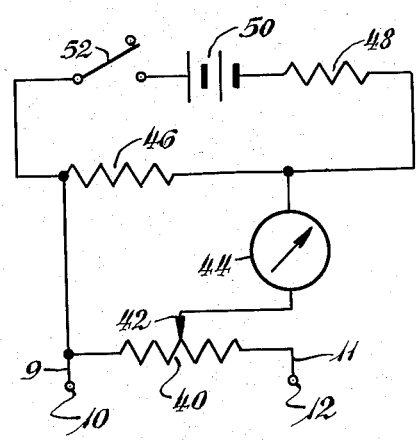
FIGURE 2 shows a potentiometric circuit for detecting the potential drop or change in potential drop across the corrosion specimen.

Turning now to FIGURE 2, a more accurate potential-detecting means 8 is shown which comprises essentially a potentiometer circuit including variable resistor 40 connected across terminals 10 and 12, wiper arm 42, fixed resistors 46 and 48, battery or equivalent E.M.F. source 50, switch 52, and microammeter 44 or equivalent galvanometer type device. In an illustrative embodiment, variable resistor 40 has a resistance of from 0 to 25 ohms, fixed resistor 48 has a resistance of 300 ohms, and fixed resistor 46 has a resistance of 25 ohms, while battery 50 is composed of mercury cells each having a voltage of 2.6 volts D.C. The potential drop across resistor 48 is then about 200 millivolts, and at the start of a corrosion measurement wiper arm 42 of variable resistance 40 is adjusted to balance the potentiometer circuit by indicating a null or zero reading on microammeter 44. Then, as corrosion proceeds the unbalance of the potentiometer is read by microammeter 44, which may give its result either in electric units or can be calibrated directly in micro-inches corrosion or other direct indication of corrosion or corrosion rate.

Figure 3:
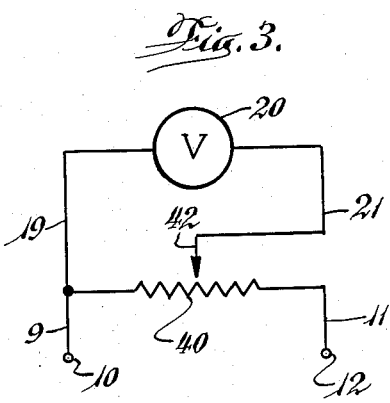
FIGURE 3 is a potential-detecting circuit employing a rheostat and a voltmeter which serves the same purpose as the FIGURE 2 circuit but features additional simplicity and provides a means for initially zeroing the voltmeter reading.

FIGURE 3 shows a potential-detecting means 8 which features exceedingly simple construction yet excellent versatility. A variable resistor 40 is bridged across terminals 10 and 12 (see FIGURE 1) of the corrosion specimen, and wiper arm 42 connects via conduit 21 to millivoltmeter 20, which in turn connects via conduit 19 to terminal 10. Millivoltmeter 20 may for example be a galvanometer-type voltmeter or may, for more accurate work, be a vacuum tube or equivalent electronic voltmeter. Before conducting a corrosion test, the position of wiper arm 42 is adjusted to give a selected reading on millivoltmeter 20, and any subsequent change in the resistance of specimen 2 caused by corrosion is immediately reflected as a change in the reading of millivoltmeter. The millivoltmeter may be correspondingly calibrated in terms of corrosion.

Turning now to FIGURE 4, an embodiment of the instant invention is shown which employs the potential-detecting or measuring circuit of FIGURE 3 for laboratory type corrosion rate measurements. The apparatus essentially comprises a container 23 with cap or cover 24 which may be screwed thereto. Cover 24 contains a variable resistor or rheostat 15 having wiper arm 16 adjustably movable thereon. Resistor 15 is bridged across opposite ends of corrosion specimen 2, as in line 1 connecting to E.M.F. source 14 and line 3 connecting to compensator resistor 4, which is protected from corrosion by glass tube 6. Compensator resistor 4 is also connected via line 5 to E.M.F. source 14 to complete the series circuit. It is particularly noted that cap or cover 24 may include terminal block 30, which is secured to a protective cover 25 to provide mechanical protection for the electric circuitry.

As further shown in FIGURE 4, corrosion test specimen 2 is replaceable and can be renewed once it has been expended. To provide this feature of replaceability, corrosion specimen 2 is clamped at each end by a clamp device including base 28 and jaws 27 and 29, respectively. Both the base and jaw may have facing surfaces of an electrically non-conductive material such as Teflon, and terminals such as terminal 26 of line 1 pass through base 28 and establish the various electrical contacts with corrosion specimen 2. For added convenience, a non-corrodible and non-conducting arm or bracket 32 is secured to cover 24 and holds corrosion specimen 2 in rigid position within the corrosive atmosphere in container 23.

FIGURE 5 shows a portable device which can be used for providing on-the-spot corrosion rate measurements of automobile radiator solutions of water and/or ethylene glycol to indicate whether such solutions are presently corrosive and require replacement or the addition of a chemical corrosion inhibitor. The device as shown comprises a housing 67 which contains E.M.F. source 14, millivoltmeter 20, and variable resistor or rheostat 15 suitably arranged in the circuit previously described with reference to FIGURE 3. One line from E.M.F. source 14 includes a mechanical switch operated by manual button 68. Rheostat has its wiper arm 16 operably controlled by knob 22, shown dotted in FIGURE 5, which rotates around axis 17. Numerals appearing in FIGURE 5 relate to the comparable components of FIGURE 1.

Housing 67 is secured to a clamp comprising arms 54 and 55, which are pivotally connected via hinge portions 60 and 61 and shaft 62 to comprise a clamp-like structure. Spring 65 holds the arms 54 and 55 in tight engagement, and accordingly the arms can be released by moving handle 66 toward housing 67. A pair of jaws 56 and 58 are attached to arm 54, and a corresponding pair of jaws 57 and 59 may be attached to arm 55. One pair of jaws may be slightly resilient and may be made of neoprene rubber or butyl rubber, while the other may be either rigid or resilient. Conduits 3, 9, 1, and 11 terminate in the jaws so as to provide electrical contacts with the ends of corrosion specimen 2. Reference specimen 4 is coated with a suitable corrosion-resistant resin and secured to the outside of arm 54 near corrosion specimen 2.

When used for on-the-spot corrosion tests, it is desirable that corrosion specimen 2 be exceedingly thin so as to give rapid indications of metal loss. For this purpose, corrosion specimen 2 may be a painted or printed electrically-conducting thin metal line or film on an insulating base, with the line or film being substantially less than one one-thousandths of an inch thick, for example one ten-thousandths of an inch thick.

To use the device of FIGURE 5, the clamp is opened by applying pressure on handle 66, and corrosion specimen 2 is then inserted between jaws 56 and 57 and jaws 58 and 59. The handle is released. The corrosion specimen 2 and clamp are then placed in the suspected corrodant. Button 68 is pressed, thereby closing the circuit, and knob 22 on rheostat 15 is adjusted to provide a zero indication on millivoltmeter 20. Button 68 may then optionally be released or may continue to be depressed. After a predetermined period of time, button 68 is again depressed (if it was previously released) and the new reading on millivoltmeter 20 is then taken. This indicates the change in resistance of corrosion specimen 2 and is accordingly a measure of the corrosion occurring during the measuring period.

As a specific example of the use of a corrosion rate measuring system of the type shown in FIGURE 5, E.M.F. source 14 is a six-volt battery, corrosion specimen 2 has a resistance of 0.1 ohm and is one thousand microinches thick; reference specimen 4 has a resistance of six ohms; rheostat 15 has a resistance of 25 ohms; and voltmeter 20 reads from 0 to 150 milliovlts (or may be a corresponding 200–2000 ohm microammeter). As soon as corrosion specimen 2 is inserted into the corroding medium and the temperature stabilizes, button 68 is depressed and knob 22 on rheostat 15 is adjusted until a 100 microvolt reading is obtained on voltmeter 20.

If corrosion specimen 2 has corroded, a higher millivoltage is observed. An increase of one millivolt corresponds approximately to five microinches corrosion. Thus one millivolt increase in 20 hours corresponded to 0.00215 inch per year (IPY) corrosion rate.

From the foregoing presentation, it is apparent that the objects of the present invention have been attained and an extremely simple conductometric corrosion system is thereby provided.

W claim:
1. A laboratory apparatus for corrosion rate measurements which comprises a container, a cover for said container, said cover carrying an expendable electrically-conducting corrosion specimen and a corrosion-insensitive compensator resistor having a resistance much larger than the resistance of said metallic electrically conducting corrosion specimen, a potentiometer connected across said expendable electrically-conducting corrosion specimen, conduit means connecting said expendable electrically conducting corrosion specimen and said corrosion-resistant compensator resistor in electrical series, a terminal block carried by said cover, additional conduit means connecting said terminal block with said expendable electrically conducting corrosion specimen, a center tap on said rheostat, and said corrosion-resistant compensator resistor; and a detachable corrosion measurement device having a terminal block removably attachable on the terminal on said container cover, said measuring device including a source of E.M.F. arranged in electrical series connection with said expendable electrically conducting corrosion specimen and said corrosion-resistant compensator resistor, and a potential detecting means connectable to one end of said potentiometer and the center tap of said potentiometer.

2. A portable apparatus for determining corrosion rates which comprises a base containing a constant voltage cell, a voltmeter, a potentiometer having terminals at remote ends thereof and having a movable wiper arm, clamp means extending from said base and adapted to engage an expendable corrosion test specimen, a high resistance corrosion-insensitive compensator resistor disposed near said expendable corrosion specimen, conduit means connecting said constant voltage cell in electrical series with said expendable electrically conducting corrosion specimen and corrosion-insensitive compensator resistor, and conduit means connecting the terminals of said potentiometer across said electrically conducting corrosion specimen and connecting said voltmeter between one of said last-named conduit means and the wiper arm of said potentiometer.

3. The portable apparatus of claim 2 including manually operated switch means in said series circuit of said constant voltage cell, said corrison specimen, and said compensator resistor.

References Cited in the file of this patent

UNITED STATES PATENTS 2,987,685    Schaschl _____ June 6, 1961

OTHER REFERENCES

"Here's How the Meter Works," by G. A. Marsh and E. Schaschl, Oil and Gas Journal, November 1955 (pp. 135–138; copy in 73–86, Div. 36).

"Corrosion Testing Procedures" (Champion), published by Chapman and Hall (London) 1952 (page 322 relied on; copy in Scientific Library).